United States Patent [19]

Lane et al.

[11] Patent Number: 4,690,769

[45] Date of Patent: Sep. 1, 1987

[54] HYDRATED CALCIUM BROMIDE REVERSIBLE PHASE CHANGE COMPOSITION

[75] Inventors: George A. Lane; Harold E. Rossow, both of Midland, Mich.

[73] Assignee: The Dow Chemical Company, Midland, Mich.

[21] Appl. No.: 894,592

[22] Filed: Aug. 8, 1986

[51] Int. Cl.$^4$ ................................................. C09K 5/06
[52] U.S. Cl. ................................ 252/70; 165/104.17; 165/902
[58] Field of Search ............................................ 252/70

[56] References Cited

U.S. PATENT DOCUMENTS 4,613,444  9/1986  Lane et al. ............................. 252/70
4,637,888  1/1987  Lane et al. ............................. 252/70

FOREIGN PATENT DOCUMENTS 180684  11/1982  Japan ..................................... 252/70

OTHER PUBLICATIONS

Linke, *Solubilities of Inorganic and Metal-Organic Compounds*, vol. I, 4th ed., 1958, p. 503.

Primary Examiner—Robert A. Wax

[57] ABSTRACT

A reversible liquid/solid phase change composition comprising a eutectic composition of $CaBr_2 \cdot 6H_2O$ and $CaBr_2 \cdot 4H_2O$, having more than 5.4 but less than 6.0 moles of $H_2O$ per mole of $CaBr_2$. The composition optionally includes additives selected from KBr and NaBr to lower the melting point of the composition. The composition optionally also includes a nucleating agent selected from Ba and Sr salts to reduce supercooling of the composition to 5° C. or less.

15 Claims, No Drawings

HYDRATED CALCIUM BROMIDE REVERSIBLE PHASE CHANGE COMPOSITION

FIELD OF THE INVENTION

The invention relates to reversible liquid/solid phase change compositions. More particularly, the invention relates to a eutectic composition of $CaBr_2.6H_2O$ and $CaBr_2.4H_2O$, having more than 5.4 but less than 6.0 molecules of $H_2O$ per mole of $CaBr_2$.

DESCRIPTION OF THE PRIOR ART

Numerous phase change materials which are capable of storing thermal energy as latent heat are identified in "Solar Heat Storage: Latent Heat Materials" Volume 1, by G. A. Lane; CRC Press, Inc., 1983. Among the phase change materials disclosed are several inorganic eutectics with transition temperatures ranging from 13° C. to 61° C. (pp 46 and 47). Eutectic systems are particularly described on pages 69 to 72 and 76 to 78. Definitions to phase transition temperature; heat of fusion; density; supercooling, and crystal growth are provided on pages 42 and 43.

A definition of nucleation and nucleators is provided on pages 116 and 143. The aforementioned definitions are applicable to the present invention and are included herein by reference.

Other publications, particularly as they relate to $CaBr_2.6H_2O$ phase change materials are Japanese publication No. 57-180684 (Matsushita Electric Works) describing a phase change material of $CaBr_2.6H_2O$ having added thereto various Barium and/or Strontium salts to prevent supercooling of the phase change material. Japanese publication No. 51-070193 (Mitsubishi Electric Corp.) discloses a phase change material comprising $CaBr_2.6H_2O$ containing a small amount of $Sr(OH)_2.8H_2O$ or $Ba(OH)_2.8H_2O$ or the anhydride to prevent supercooling of the composition. Japanese publication No. 57-076079 (Mitsubishi Electric Corp.) discloses a phase change composition of $CaCl_2$ and/or $CaBr_2.6H_2O$ containing a small amount of Sr or Ba oxide to prevent supercooling of the phase change composition.

BACKGROUND OF THE INVENTION

Storage materials which undergo a change in phase have been employed as an attractive alternative to materials which store thermal energy as sensible heat such as, for example, by raising the temperature of water or rocks. In contrast, a phase material (PCM) absorbs a large quantity of latent thermal energy during their phase change from a solid to a liquid and releases such thermal energy at a constant temperature as the process is reversed.

Several classes of phase change materials consisting of hydrated inorganic salts exist and can be generally divided into two groups:

(1) salt hydrates that go through many cycles of freezing and thawing without an appreciable separation of their chemical components are classified as congruent melting and eutectic salt hydrates, and (2) salt hydrates which undergo an appreciable segregation of their chemical components during repeated cycles of freezing and thawing are generally classified as semi-congruent melting or incongruent melting.

Salt hydrates of group (1) which are "congruent melting" are hydrated materials such as, for example, $CaBr_2.6H_2O$ for which, at the melting point, with solid and liquid phases in stable equilibrium, the solid phase contains no hydrated $CaBr_2$ other than the hexahydrte and the liquid phase contains 6 moles of water for every mole of $CaBr_2$, plus sufficient water to form the stable hydrate of any additive materials in solution.

Eutectic salt hydrates are mixtures of two or more components mixed in such a ratio that the melting point of the mixture is lower than that of any component and the entire mixture at one and the same temperature passes from a solid form (frozen) into a liquid form and vice versa. An Example of a eutectic salt hydrate is one comprising 58.7 weight percent $Mg(NO_3)_2.6H_2O$ and 41.3 weight percent $MgCl_2.6H_2O$. The salt hydrate of the type herein under consideration is a eutectic salt hydrate.

Mixtures of components which form a eutectic other than the eutectic composition hereinbefore defined are included within the scope of the present invention and are classified as either "hyper-eutectic" or "hypo-eutectic" hydrated salt mixtures. The hyper-eutectics contain more and the hypo-eutectics contain less of the principle component than the eutectic composition.

$CaBr_2.6H_2O$ contains 64.90 weight percent $CaBr_2$ and melts at a temperature of 34.3° C. The hexahydrate is congruent-melting, and forms a eutectic with the tetrahydrate containing 66.95 weight percent $CaBr_2$ which melts at a temperature of 33.8° C., with a 5.57 degree of hydration. While the heat of fusion for $CaBr_2.6H_2O$ is lower than for some other salt hydrates, a significant property is its very high density. On a volumetric basis, the heat of fusion of 54 $cal/cm^3$ is high relative to many other hydrated inorganic salts. On a weight basis, the heat of fusion for $CaBr_2.6H_2O$ is 27.6 cal/g. For applications where space is at a premium, $CaBr_2.6H_2O$ is thus a very desirable phase change material.

TERMS

The term "supercooling" refers to a discrepancy between the temperature at which freezing initiates and the melting temperature of a given hydrated salt when cooled and heated under quiescent conditions.

The terms "nucleator" and "nucleating agent" refer to small "seed" crystals which initiate crystallization. In order for any nucleation and crystal growth to occur, the melted phase change material must be supersaturated or supercooled. If the phase change material is below its melting point, the addition of nucleating crystals tends to initiate crystallization.

A eutectic phase change material freezes to a polycrystalline mixture of the separate components of the eutectic. Nucleation is possible by initiating freezing of one of these phases. If only one phase begins to freeze, depletion in the remaining liquid of the composition raises the liquidus temperature of the other phase until critical supercooling is obtained. At this point, the second phase nucleates and begins to freeze.

The term "Additive" includes, in addition to nucleators or nucleating agents, KBr and/or NaBr to effect a lowering of the melting point of the phase change material.

Phase change materials are ideally packaged in individual encapsulating means for use in conjunction with solar heating systems for commercial or residential buildings, for use in heat exchange systems in which exchange coils or plates are positioned within bulk containers containing the phase change material, and the like. Exemplary of suitable known encapsulating means for heat storage materials may also be included water impervious films or foils of plastic/metal laminates. Other useful encapsulating means are concrete, metal or plastic containers, pipes, and the like.

SUMMARY OF THE INVENTION

The invention resides in a reversible liquid/solid phase change composition comprising a eutectic of $CaBr_2.6H_2O$ and $CaBr_2.4H_2O$ having more than 5.4 but less than 6.0 moles of $H_2O$ per mole of $CaBr_2$.

The invention also resides in a heat storage device comprising an encapsulating means having a reversible liquid/solid phase change composition hermetically sealed in said encapsulating means to prevent evaporation of water from the composition, said composition comprising a eutectic of $CaBr_2.6H_2O$ and $CaBr_2.4H_2O$ having more than 5.4 but less than 6.0 moles of $H_2O$ per mole of $CaBr_2$.

The invention further resides in a method of storing heat, comprising the steps of preparing a reversible liquid/solid phase change composition by admixing $CaBr_2$ and to form a eutectic having more than 5.4 but less than 6.0 moles of $H_2O$ per mole of $CaBr_2$, introducing the composition into an encapsulating means for use as a thermal energy storage device, and hermetically sealing the encapsulating means to prevent evaporation of water from the composition.

Preferably, the composition includes selected nucleating agents in order to effectively reduce supercooling of the hydrated eutectic composition.

Optionally, the phase change composition of the invention also includes, as an additive, KBr and/or NaBr in an amount effective to lower the melting point of the composition.

DETAILED DESCRIPTION OF THE INVENTION

The present invention represents a significant improvement in the development of a eutectic composition of $CaBr_2.6H_2O$ and $CaBr_2.4H_2O$ which melts and freezes completely and reversibly at a temperature of 33.4° C. and to which water of varying amounts can be added without causing a segregation of the hexahydrate and tetrahydrate phases. Even with varying amounts of water in the composition, the composition still melts and freezes nearly isothermally, i.e. at a constant temperature. The isothermal freezing process which takes place is sometimes referred to as a "phase reaction" in which the liquid phase is disappearing, while the two solid phases of the eutectic composition are growing. It should be noted that segregation of the material formed by the phase reaction during freezing or by the opposite reaction during melting, will not likely take place. Since both solids are forming together, they will remain intimately mixed.

In a congruent melting phase change material such as $CaBr_2.6H_2O$, the phase change material does not segregate during melting and freezing. The material stores heat isothermally, completely melting at a temperature of 34.3° C. and reversibly freezing at the same temperature (at equilibrium). However, in industrial scale manufacturing plants, where phase change materials are employed in bulk quantity, it may require great care and close control of process parameters to assure that the $CaBr_2$ salt contains exactly 6.0 moles of $H_2O$ per mole of $CaBr_2$. Any excess $H_2O$ which may be present in the composition is highly detrimental because, during freezing, crystalline $CaBr_2.6H_2O$ is formed, leaving behind a saturated solution of $CaBr_2$ in the excess $H_2O$. If the temperature is lowered, additional hexahydrate crystallizes but complete freezing is not achieved until the cryohydric point (the temperature at which a cryohydrate crystallizes from a freezing mixture) is reached at a temperature well below 0° C.

A eutectic composition of the present invention has the advantage that any extra water which may be present in varying amounts will still melt and freeze the composition nearly isothermally. The melting range of the composition remains within a temperature range of only 0.4° to 0.8° C.

In the phase change composition of the invention, the $CaBr_2.4H_2O$ is present in the composition in an amount of greater than 0 weight percent but less than 30 weight percent and the $CaBr_2.6H_2O$ is present in an amount of less than 100 weight percent but greater than 70 weight percent. More particularly, if the composition contains more than 5.4 moles of water per mole of $CaBr_2$ the $CaBr_2.4H_2O$ is present in the composition in an amount of less than 30 weight percent while the $CaBr_2.6H_2O$ is present in the composition in an amount greater than 70 weight percent. When the composition contains 5.6 moles of $H_2O$ per mole of $CaBr_2$, the composition contains 20 weight percent $CaBr_2.4H_2O$ and 80 weight percent $CaBr_2.6H_2O$. At 5.7 moles of $H_2O$ per mole of $CaBr_2$, the composition contains 10 weight percent of $CaBr_2.4H_2O$ and 90 weight percent $CaBr_2.6H_2O$. When the composition contains less than 6.0 moles water per mole of $CaBr_2$, the $CaBr_2.4H_2O$ is present in the composition in an amount greater than 0 weight percent while the $CaBr_2.6H_2O$ is present in the composition in an amount of less than 100 weight percent. Preferably, the eutectic composition contains from 5.5 to 5.8 moles of $H_2O$ per mole of $CaBr_2$. Most preferably, the composition contains about 5.6 moles of $H_2O$ per mole of $CaBr_2$.

The composition preferably includes a nucleating agent selected from BaO, $Ba(OH)_2$, $Ba(OH)_2.8H_2O$, $BaCO_3$, $BaSO_4$, $BaCl_2$, $BaCl_2.2H_2O$, $BaBr_2$, $BaBr_2$, $BaBr_2.2H_2O$, $BaI_2$, $BaI_2.6H_2O$, SrO, $Sr(OH)_2$, $SrCO_3$, $SrSO_4$, $SrCl_2$, $SrCl_2.6H_2O$, $SrBr_2$, $SrBr_2.6H_2O$, $SrI_2$, $FeF_2$, and mixtures thereof. Preferred nucleators are BaO, $Ba(OH)_2$, $Ba(OH)_2.8H_2O$, $BaCl_2$, $BaCl_2.2H_2O$, $BaI_2.6H_2O$, $SrBr_2$, and $SrBr_2.6H_2O$, and mixtures thereof.

A nucleator is added to the composition in an amount effective to suppress the supercooling properties of the hydrated $CaBr_2$ liquid phase. Effective amounts of a selected nucleator for the hydrated $CaBr_2$ salt of the invention are determined by testing a given composition over repetitive phase change cycles in a manner similar to the procedure employed in copending U.S. application Ser. No. 364,159.

A nucleator in an amount in excess of about 2.0 weight percent of the weight of the composition is generally not detrimental to the performance of the phase change composition and, by the same token, does not provide any increase in benefit. Accordingly, the nucleator is preferably present in an amount of from about 0.005 to about 2.0 weight percent based on the total weight of the composition.

The composition of the present invention optionally also includes KBr and/or NaBr which acts as a modifier to vary the freezing point of the basic phase change composition. The modifier is present in the composition in an amount of greater than 0 weight percent up to about 5.0 weight percent based on the total weight of the composition. An amount larger than about 5.0 weight percent is generally not detrimental to the performance of the phase change composition and, by the same token, does not provide any increase in benefit in varying the freezing point of the composition. The effect of adding KBr and/or NaBr to the composition is to lower the freezing point of the composition by as much as 3° C.

Impurities may also be present in the phase change composition in minor amounts of less than about 3.0 weight percent and provide that such impurities do not detrimentally affect the function of the basic composition of the invention which may include the hereinbefore specified nucleating agents and modifying additives. Impurities may include, for example, LiBr, $MgBr_2$, $CaCl_2$, $CaI_2$, and mixtures thereof.

The following examples illustrate the effectiveness of the eutectic composition of the invention in which extra water of varying amounts is introduced into the hydrated calcium bromide composition which still melts and freezes nearly isothermally and within a range of 0.4° to 0.8° C.

COMPARATIVE EXAMPLE 1

$CaBr_2.6H_2O$ is prepared by mixing water and hydrated $CaBr_2$. The mixture is brought to an equilibrium at the melting point so that both solid and liquid $CaBr_2.6H_2O$ are present. The hexahydrate contains 64.90 percent by weight $CaBr_2$ and has a melting point at 34.3° C. At equilibrium, the composition freezes completely at this temperature to form 100 mole percent $CaBr_2.6H_2O$.

This example shows that the congruent melting phase change material of $CaBr_2.6H_2O$ is very satisfactory and does not segregate during melting and freezing. The composition stores thermal energy isothermally and completely melts at a temperature of 34.3° C. and reversibly freezes at the same temperature at equilibrium. Although the composition performs very satisfactorily, great care and close control of process parameters have to be excercised in the use of this material in an industrial manufacturing plant to assure that the phase change material contains exactly 6.0 moles of $H_2O$ per mole of $CaBr_2$.

COMPARATIVE EXAMPLE 2

In the same manner as in Example 1, a hydrated $CaBr_2$ phase change material is prepared except that an excess of water is used to prepare a composition having 6.4 moles of water per mole of $CaBr_2$. This phase change material has a melting temperature below 32.6° C. The composition melts completely at 32.6° C. but freezing occurs over a temperature range, and is not absolutely complete until the composition reaches a temperature well below 0° C.

This example shows the effect of having an excess of water, i.e. 6.4 moles in the composition. During freezing, crystalline $CaBr_2.6H_2O$ is formed leaving behind a saturated solution of $CaBr_2$ in the extra water. If the temperature is lowered, more hexahydrate crystallizes but complete freezing is not achieved until the cryohydric point (the temperature at which a cryohydrate crystallizes from a freezing mixture), well below 0° C., is reached.

EXAMPLE 3

In the same manner as in Example 1, a phase change material is prepared containing 5.6 moles of water per mole of $CaBr_2$. The eutectic composition has a melting point of 33.4° C. The material freezes completely at 33.4° C. and forms an intimate mixture of 80 mole percent $CaBr_2.6H_2O$/20 mol percent $CaBr_2.4H_2O$ with no liquid remaining in the composition.

This example describes a eutectic composition of the invention containing 5.6 moles of water which melts and freezes completely and reversibly at equilibrium, i.e. at a temperature of 33.4° C.

EXAMPLE 4

Three samples are prepared in the same manner as in Example 1 except that the eutectic compositions contain 5.7; 5.8, and 5.9 moles of water per mole of $CaBr_2$. The three (3) compositions have a melting range of from 33.4° C. to 33.8° C.; from 33.4° C. to 34.0° C. to 34.0° C., and from 33.4° C. to 34.2° C., respectively. Each of these samples freeze completely at a temperature of 33.4° C. to form an intimate mixture containing an amount of greater than 80 mole percent $CaBr_2.6H_2O$ and less than 20 mole percent $CaBr_2.4H_2O$.

Each of the compositions melt and freeze nearly isothermally with the melting range being within the narrow temperature range of from 0.4° to 0.8° C.

EXAMPLE 5

A sample is prepared similar to that of Example 3 except that the hydrated composition is saturated with 2.6 weight percent potassium bromide. The eutectic composition contains 5.5 moles of water per mole of $CaBr_2$ and has a melting point of 31.9° C. The composition freezes completely at this temperature. This example illustrates that it is possible to vary the freezing point of the eutectic composition by adding KBr to lower the melting point by 2.4° C.

EXAMPLE 6

A sample is prepared as in Example 5 except that NaBr is added to the eutectic composition in place of KBr. The eutectic composition contains 5.6 moles of water per mole of $CaBr_2$ and 0.4 weight percent NaBr. The composition has a melting point of 33.1° C. and freezes completely at this temperature. Example 6 shows that is is possible to vary the freezing point of the composition by 1.2° C. by the addition of NaBr.

EXAMPLE 7

A sample of a phase change material is prepared from 64.9 weight percent $CaBr_2$ and 35.1 weight percent water. Freeze-thaw tests are conducted using aliquots of the $CaBr_2$ composition, each having a weight of 65 g. Ten successive freeze-thaw cycles are conducted by alternately freezing each aliquot in a water bath at a temperature of about 10° C. and then melting the aliquot in an oven at a temperature of 40° C. Out of ten successive freeze-thaw cycles, the $CaBr_2$ composition fails to crystallize nine times and has to be seeded with frozen $CaBr_2$ hexahydrate in order to crystallize. On the third cycle, the material freezes spontaneously at a temperature of 22° C., with 12° C. supercooling. This example indicates the need for the addition of a nucleating agent in order to obtain supercooling of the $CaBr_2$ composition.

EXAMPLE 8

To another aliquot of the same $CaBr_2$ composition of Example 7, a sufficient amount of $BaCl_2.2H_2O$ is added as a nucleator to provide a phase change composition containing 0.5 weight percent $BaCl_2$. Under the same procedure of freeze-thaw cycling as in Example 7, the sample freezes spontaneously ten times out of ten, with an average supercooling of 8° C. This example indicates that $BaCl_2$ is effective as a nucleator in the $CaBr_2$ composition of the invention. However, in this example, a greater amount of the nucleator is desirable, i.e., above 5.0 weight percent, in order to control supercooling of the composition to less than about 5° C.

When 0.5 weight percent BaO is substituted for $BaCl_2$ as a nucleator, the sample freezes spontaneously ten out of ten cycles with an average supercooling of 1° C. This example shows that BaO is an excellent nucleator for the $CaBr_2$ phase change composition of the invention.

EXAMPLE 9

Further tests are conducted with 50 g aliquots of the phase change composition of Example 7. The aliquots are again subjected to ten cycles of freezing at room temperature and melting in an oven at a temperature of 50° C. With three nucleators selected from $BaI_2$ (from the hexahydrate), $Ba(OH)_2$ (from the octahydrate), and $SrBr_2$ (from the hexahydrate), ten out of ten samples freeze spontaneously with an average supercooling of 7° C., 4° C., and 10° C., respectively. These tests show that the three nucleators are effective. However, in order to control supercooling to less than 5° C., especially in the case of $BaI_2$ and $SrBr_2$, an additional amount of the nucleator, i.e., above 0.5 weight percent is described.

Several other nucleators show nucleation activity but are somewhat less effective, with the nucleator freezing spontaneously on some cycles and not freezing on other cycles until the sample is placed in an ice bath. The addition of $Sr(OH)_2$ as a nucleator causes freezing spontaneously in three out of ten cycles. The addition of $SrI_2$ to the phase change composition causes freezing of the composition in two out of ten cycles. The addition of barium sulfate as a nucleator to the composition causes freezing of the composition in four out of ten cycles. The experiments show an average supercooling of 7° C., 2° C., and 11° C., respectively, for the $Sr(OH)_2$, $SrI_2$, and barium sulfate nucleators. A greater amount of the nucleators, i.e., greater than 0.5 weight percent, would be required in each case in order to reduce supercooling to less than 5° C.

From Examples 8 and 9, it can be concluded that the preferred nucleators, in the order of effectiveness, are BaO, $Ba(OH)_2$, $Ba(OH)_2.8H_2O$, $BaI_2$, $BaI_2.6H_2O$, $BaCl_2$, $BaCl_2.2H_2O$, $SrBr_2$, and $SrBr_2.6H_2O$.

What is claimed is:

1. A reversible liquid/solid phase change composition comprising a eutectic composition of $CaBr_2.6H_2O$ and $CaBr_2.4H_2O$ having more than 5.4 but less than about 5.8 moles of water per mole of $CaBr_2$.

2. The composition of claim 1, having 5.6 moles of water per mole of $CaBr_2$.

3. The composition of claim 1 or 2, wherein the $CaBr_2.4H_2O$ is present in the eutectic composition in an amount greater than 0 weight percent but less than 30 weight percent, and wherein said $CaBr_2.6H_2O$ is present in an amount of less than 100 weight percent but greater than 70 weight percent.

4. The composition of claim 1, including a modifying additive selected from the group consisting of KBr and NaBr, said additive being present in an amount sufficient to lower the melting point of the eutectic composition.

5. The composition of claim 4, wherein said mofifying additive is present in an amount of from about 0.5 to 8.0 weight percent.

6. The composition of claim 1 or 4, including a nucleating agent in an amount sufficient to reduce supercooling of the eutectic composition to 5° C. or less during retrieval of stored thermal energy upon crystallization of the eutectic composition.

7. The composition of claim 6, wherein the nucleating agent is present in an amount of from about 0.005 to about 2.0 weight percent.

8. The composition of claim 6, wherein the nucleating agent is selected from the group consisting of BaO, $Ba(OH)_2$, $Ba(OH)_2.8H_2O$, $BaCO_3$, $BaSO_4$, $BaCl_2$, $BaCl_2.2H_2O$, $BaBr_2$, $BaBr_2.2H_2O$, $BaI_2$, $BaI_2.6H_2O$, SrO, $Sr(OH)_2$, $SrCO_3$, $SrSO_4$, $SrCl_2$, $SrCl_2.6H_2O$, $SrBr_2$, $SrBr_2.6H_2O$, $SrI_2$, and $FeF_2$.

9. The composition of claim 7, wherein said nucleating agent is selected from BaO, $Ba(OH)_2$, $Ba(OH)_2.8H_2O$, $SrBr_2$, $SrBr_2.6H_2O$, $BaI_2$, $BaI_2.6H_2O$, $BaCl_2$, and $BaCl_2.2H_2O$.

10. A heat storage device comprising an encapsulating means having a reversible liquid/solid phase change composition hermetically sealed in said encapsulating means to prevent evaporation of water from the composition, said composition comprising a eutectic composition of $CaBr_2.6H_2O$ and $CaBr_2.4H_2O$ having more than 5.4 but less than about 5.8 moles of water per mole of $CaBr_2$.

11. The storage device of claim 10, wherein said eutectic composition includes from about 0.5 to about 8.0 weight percent of a modifier selected from the group consisting of KBr and NaBr for lowering the melting point of the composition by less than 3° C.

12. The storage device of claim 10, wherein said eutectic composition includes a nucleating agent in an amount of from about 0.005 to about 2.0 weight percent, wherein said nucleating agent is selected from the group consisting of BaO, $Ba(OH)_2$, $Ba(OH)_2.8H_2O$, $BaCO_3$, $BaSO_4$, $BaCl_2$, $BaCl_2.2H_2O$, $BaBr_2$, $BaBr_2.2H_2O$, $BaI_2$, $BaI_2.6H_2O$, SrO, $Sr(OH)_2$, $SrCO_3$, $SrSO_4$, $SrCl_2$, $SrCl_2.6H_2O$, $SrBr_2$, $SrBr_2.6H_2O$, $SrI_2$, and $FeF_2$.

13. A method of storing thermal energy, comprising the steps of preparing a reversible liquid/solid phase change composition by admixing $CaBr_2$ and water to form a eutectic composition of $CaBr_2.6H_2O$ and $CaBr_2.4H_2O$ having more than 5.4 but less than 6.0 moles of water per mole of $CaBr_2$, introducing the composition into an encapsulating means for use as a heat storage device, and hermetically sealing the encapsulating means to prevent evaporation of water from the composition.

14. The method of claim 13 wherein said eutectic composition includes from about 0.5 to about 5.0 weight percent of a modifier selected from the group consisting of KBr and NaBr for lowering the melting point of the composition.

15. The method of claim 13, wherein said eutectic composition includes a nucleating agent in an amount of from about 0.005 to about 2.0 weight percent, wherein said nucleating agent is selected from the group consisting of BaO, $Ba(OH)_2$, $Ba(OH)_2.8H_2O$, $BaCO_3$, $BaSO4$, $BaCl_2$, $BaCl_2.2H_2O$, $BaBr_2$, $BaBr_2.2H_2O$, $BaI_2$, $BaI_2.6H_2O$, SrO, $Sr(OH)_2$, $SrCO_3$, $SrSO_4$, $SrCl_2$, $SrCl_2.6H_2O$, $SrBr_2$, $SrBr_2.6H_2O$, $SrI_2$, $FeF_2$.

* * * * *